US009589314B2

(12) United States Patent
Seetharamaiah et al.

(10) Patent No.: US 9,589,314 B2
(45) Date of Patent: Mar. 7, 2017

(54) QUERY PROCESSING FOR TILE-BASED RENDERERS

(71) Applicant: QUALCOMM Incorporated, San Diego, CA (US)

(72) Inventors: Avinash Seetharamaiah, Chuluota, FL (US); Hitendra Mohan Gangani, Orlando, FL (US); Nigel Terence Poole, West Newton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 14/014,118

(22) Filed: Aug. 29, 2013

(65) Prior Publication Data

US 2014/0320512 A1 Oct. 30, 2014

Related U.S. Application Data

(60) Provisional application No. 61/817,154, filed on Apr. 29, 2013.

(51) Int. Cl.
*G06T 1/20* (2006.01)
*G06T 1/60* (2006.01)
*G06T 15/40* (2011.01)
*G06T 15/00* (2011.01)

(52) U.S. Cl.
CPC .................. *G06T 1/60* (2013.01); *G06T 1/20* (2013.01); *G06T 15/005* (2013.01); *G06T 15/40* (2013.01)

(58) Field of Classification Search
None
See application file for complete search history.

(56) References Cited

U.S. PATENT DOCUMENTS

| 6,636,215 | B1 | 10/2003 | Greene |
| 6,952,206 | B1 | 10/2005 | Craighead |
| 7,425,956 | B1 | 9/2008 | Lefebvre et al. |
| 7,519,797 | B1 * | 4/2009 | Stiehl .................... G06F 9/3867 |
| | | | 712/225 |
| 2011/0018884 | A1 | 1/2011 | Ritts et al. |
| 2013/0076762 | A1 * | 3/2013 | Heggelund et al. .......... 345/502 |

OTHER PUBLICATIONS

OpenGL, "Thread: Nested Timer Queries," 2011, retreived from https://www.opengl.org/discussion_boards/showthread.php/175282-Nested-Timer-Queries on May 18, 2015.*
Cozzi, et al., "OpenGL Insights",Jul. 10, 2012, XP002727849,Retrieved from the Internet: URL:http://www.seas.upenn.edu/~pcozzi/OpenGLInsights/OpenGLInsights-TileBasedArchitectures.pdf [retrieved on Jul. 28, 2014], 14 pp.
International Search Report and Written Opinion—PCT/US2014/034833—ISA/EPo—Aug. 6, 2014, 13 pp.

(Continued)

*Primary Examiner* — Ryan D McCulley
(74) *Attorney, Agent, or Firm* — Shumaker & Sieffert, P.A.

(57) ABSTRACT

Systems, methods, and apparatus for performing queries in a graphics processing system are disclosed. These systems, methods, and apparatus may be configured to read a running counter at the start of the query to determine a start value, wherein the running counter counts discrete graphical entities, read the running counter at the end of the query to determine an end value, and subtract the start value from the end value to determine a result.

23 Claims, 7 Drawing Sheets

(56) References Cited

OTHER PUBLICATIONS

Microsoft "Accurately Profiling Direct3D API Calls (Direct3D 9)", Sep. 8, 2010, XP002727846, Retrieved from the Internet: URL:http://msdn.microsoft.com/en-us/library/windows/desktop/bb172234%28v=vs.85%29.aspx, 40 pp.

Nvidia "Nvidia Perfkit—Nvidia Performance Toolkit", Jun. 2012 (Jun. 2012), XP002727847, Retrieved from the Internet: URL:https://developer.nvidia.com/sites/default/files/akamai/tools/docs/Perfkit_User_Guide_2.2.0.12166.pdf, 37 pp.

Rutenberg, "Profiling Code Using clock_gettime", Sep. 26, 2007, XP002727848, Retrieved from the Internet: URL:http://www.guyrutenberg.com/2007/09/22/profiling-code-using-clock/gettime/ [retrieved on Jul. 28, 2014], 31 pp.

Second Written Opinion—PCT/US2014/034833—ISA/EPO—Apr. 20, 2015, 8 pp.

Reply to Second Written Opinion from corresponding PCT Application Serial No. PCT/US2014/034833 filed on May 19, 2015 (7 pages).

Reply to First Written Opinion from corresponding PCT Application Serial No. PCT/US2014/034833 filed on Feb. 23, 2015 (18 pages).

International Preliminary Report on Patentability from corresponding PCT Application Serial No. PCT/US2014/034833 dated Aug. 13, 2015 (22 pages).

\* cited by examiner

FIG. 5
FIG. 6

QUERY PROCESSING FOR TILE-BASED RENDERERS

This application claims the benefit of U.S. Provisional Application No. 61/817,154, filed Apr. 29, 2013, the entire content of which is incorporated herein by reference.

TECHNICAL FIELD

This disclosure relates to graphics processing systems, and more particularly, to query processing for tile based renderers.

BACKGROUND

Computing devices often utilize a graphics processing unit (GPU) to accelerate the rendering of graphics data for display. Such computing devices may include, e.g., computer workstations, mobile phones (e.g., so-called smartphones), embedded systems, personal computers, tablet computers, and video game consoles. Rendering generally refers to the process of converting a three-dimensional (3D) graphics scene, which may include one or more 3D graphics objects, into two-dimensional (2D) rasterized image data. A graphics scene may be rendered as a sequence of one or more frames where each frame depicts the graphics scene at a particular instance in time.

A GPU may include a 3D rendering pipeline to provide at least partial hardware acceleration for the rendering of a 3D graphics scene. The 3D graphics objects in a scene may be subdivided by a graphics application into one or more 3D graphics primitives (e.g., points, lines, triangles, patches, etc.), and the GPU may convert the 3D graphics primitives of the scene into 2D rasterized image data for each of the frames to be rendered. Therefore, in the specific context of GPU rendering, rendering may refer to the process of converting 3D graphics primitives that correspond to 3D objects in a graphics scene into 2D rasterized image data.

To render the 3D graphics primitives for a particular frame, a graphics application executing on a host central processing unit (CPU) may place geometry data corresponding to the primitives to be rendered into a GPU-accessible memory, place one or more GPU state set-up commands into the command stream, and place one or more draw calls into the command stream that cause the GPU to render the primitives based on the geometry data. The GPU may process the commands contained in the command stream in the order in which the commands were placed in the command stream, thereby rendering the scene.

With tile-based rendering, a query result is output on per tile basis by the GPU and later accumulated by the CPU. Query results may include, for example, the results from an occlusion query, timestamp query, pipeline status query (pipeline stats), etc. An occlusion query is a query in graphics processing that determines if an object to be rendered is occluded by other objects in a graphical scene (or tile) or not. Accordingly, a query result from such a query is data providing an indication if an object to be rendered is occluded by other objects in a graphical scene (or tile) or not.

In some examples, a timestamp is a sequence of characters or encoded information identifying when a certain event occurred. The timestamp may provide, for example, a date and time that an event occurred. The timestamp may be accurate to a small fraction of a second. A timestamp query may be used to check the timing of certain events in a graphical scene, e.g., by comparing time stamps from a start to a stop of such a query. Accordingly, a query result from such a query may be the difference of time stamps from a start to a stop of such a query.

A pipeline status query or pipeline stats query may be used to check various statistics and status information of a graphics pipeline. Accordingly, a query result from such a query may be data related to various statistics and status information of a graphics pipeline.

The amount of memory needed to store this intermediate per-tile results increases linearly with an increase in the number of tiles. In addition, when a query result is requested, the CPU or other processor may need to accumulate the result in n memory locations to come up with a final value, where "n" is the number of tiles used to render the scene. An increase in the number of tiles also increases the amount of time taken by the CPU to do the accumulation. A more memory and time efficient way to perform such queries may be advantageous.

BRIEF DESCRIPTION OF DRAWINGS

FIG. 5 is a conceptual diagram illustrating an example memory map.

FIG. 6 is a conceptual diagram illustrating example memory map according to this disclosure.

DETAILED DESCRIPTION

Figure 1:
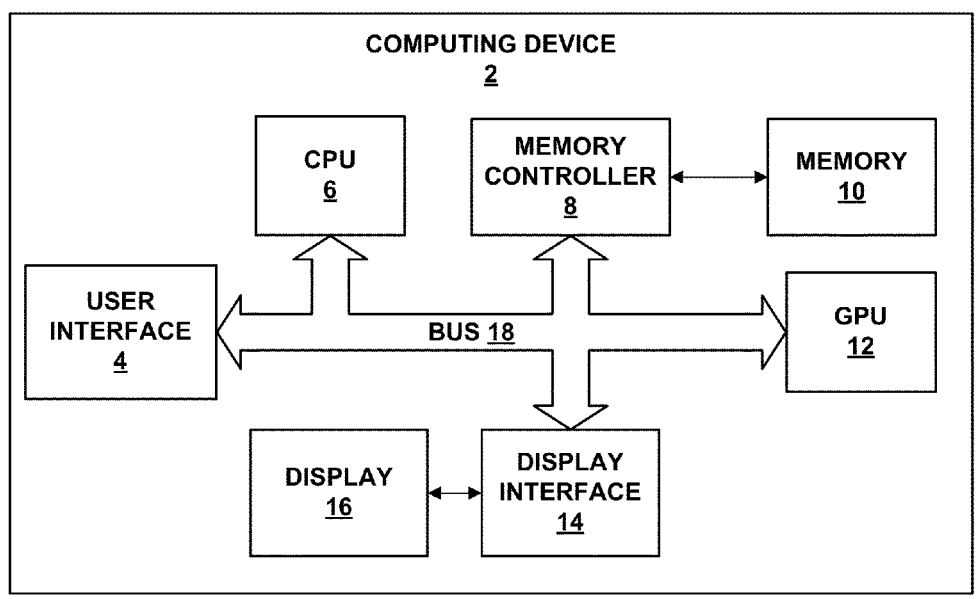
FIG. 1 is a block diagram illustrating an example computing device that may be used to implement the techniques of this disclosure.

This disclosure relates to graphics processing systems, and more particularly, to query processing for tile-based renderers. Tile-based rendering is a processing technique whereby a frame or other region to be rendered is divided into tiles (e.g., rectangular or square regions) and each tile is rendered separately. Tile-based rendering may be used to exploit local spatial coherence in the scene, to facilitate the use of limited hardware rendering resources (e.g., fast graphics memory) later in the graphics pipeline, or both. Generally, in tiled-based rendering a system, apparatus, or device, such as a computer graphics device may divide a frame into, for example, a regular grid. The grid forms tiles, which are portions of the frame or other region. Each tile may be rendered using the same rendering command stream as the other tiles.

In some examples, binning or tile-based rendering may provide a way to render a 3D scene in smaller parts called "tiles" or "bins." As discussed above, tile based rendering may be used to exploit local spatial coherence in the scene, to facilitate the use of limited hardware rendering resources later in the graphics pipeline, or both. Generally, in tiled based rendering is system, apparatus, or device, such as a computer graphics device may divide a frame into, for example a regular grid. The grid forms tiles, which are portions of the frame or other region. In an example, each tile or bin may be rendered using the same rendering command stream.

For purposes of illustration, occlusion queries will be discussed, but it will be understood that these techniques of this disclosure may be applied to other types of queries as well. As discussed above, in some examples, an occlusion query is a query in graphics processing that determines if an object to be rendered is occluded by other objects in a graphical scene (or tile) or not. Several types of queries, which are designed to query different types of information from, for example, the GPU are possible. Examples include occlusion queries, timestamp queries, pipeline status queries (pipeline stats), etc. In some examples, a timestamp is a sequence of characters or encoded information identifying when a certain event occurred. The timestamp may provide, for example, a date and time that an event occurred. The timestamp may be accurate to a small fraction of a second. A timestamp query may be used to check the timing of certain events in a graphical scene, e.g., by comparing time stamps from a start to a stop of such a query. A pipeline status query or pipeline stats query may be used to check various statistics and status information of a graphics pipeline. The techniques of this disclosure may also be applied to timestamp queries, pipeline status queries (pipeline stats), and other types of queries.

As discussed above, graphics processing systems may use occlusion queries to determine, for example, if an object to be rendered is occluded by other objects in a graphical scene (or tile) or not. In other words, the graphics processing systems may use occlusion queries to determine if an object to be rendered is blocked by other objects in a graphical scene (or tile) such that it cannot be viewed or if the object to be rendered is not blocked by other objects in a graphical scene (or tile) such that it can be viewed. In some examples, objects may be blocked, partially blocked, or visible. The graphics processor may use this information to make rendering more efficient. For example, by not rendering objects that are occluded, i.e., blocked such that they cannot be seen processing resources may be conserved, making rendering of the tile more efficient. Objects that are not occluded may be rendered. In some examples, objects that are partially occluded may be rendered. In other examples, objects that are partially occluded may not be rendered. Partially occluded objects may be partially rendered or broken into smaller and smaller objects and re-tested. It will be understood, however, that at some point it will generally be more advantageous in terms of use of processing resources to simply render the object or the visible portion of the object rather than spend more processing resources performing further occlusion queries. Rendering of occluded objects may depend, for example, on how much of the object is occluded.

Graphics processing may be performed by defining a set of primitives (polygons, e.g., triangles) representing an output, such as a frame to be displayed or rendered. Each primitive of the render output is usually defined and represented as a set of vertices, with each vertex having associated with it a set of data values for the vertex.

Primitives for the output may then be rasterized to generate a plurality of discrete graphical entities that may be further processed to generate a rendered output. These discrete graphical entities may be pixels. The discrete graphical entities may not always correspond exactly to a single pixel in the render output, however. This is due to, for example, down-scaling.

Occlusion queries typically count the number of discrete graphical entities, e.g., pixels, samples, etc., for a given object or objects that are visible and using the count to determine if the object or objects formed from the discrete graphical entities is visible, if parts of the object or objects are visible, or both. Various mechanisms allow for a determination of how many graphical entities such as pixels or samples, were rasterized.

A typical occlusion query sequence may include (1) start occlusion query, (2) draw one or more objects, (3) end occlusion query, and (4) obtain results of how many samples were rendered. The amount of memory needed to store an intermediate per-tile results in a query such as an occlusion query may increase linearly with an increase in the number of tiles. An increase in the number of tiles also increases the amount of time taken by the CPU to do the accumulation, e.g., when the final query result is requested. In one example, a more memory efficient way to perform such queries may read a running counter at the start of a query to determine a start value, wherein the running counter counts the samples rendered, read the running counter at the end of the query to determine an end value, and subtracting the start value from the end value to determine a result and perform this operation per bin/tile re-using the same start counter and end counter memory locations. Examples are discusses herein related to occlusion query processing for tile-based renderers. It will be understood, however, that in other examples, other types of queries such as timestamp query, pipeline status query (pipeline stats), and other types of queries may be processed using these techniques.

FIG. 1 is a block diagram illustrating an example computing device 2 that may be used to implement the query processing techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

In some examples, e.g., when computing device 2 comprises a personal computer, a desktop computer, a laptop computer, a computer workstation, a video game platform or console, for example, the computing device may perform query processing for a tile-based renderer, e.g., when processing video data for display on a video display.

If computing device 2 is a wireless communication device or other similar device it may code one or more bit streams of data, such as voice communications data, video data, text messages, data files, and other forms of data that may be transmitted or received as bit streams of data. A bit stream may be a time series or sequence of bits. Similarly, a byte stream may be a series of bytes, for example 8 bits each. As used herein a bit stream may include a byte stream. For example, a byte stream may be regarded as a special case of a bit stream. (A byte stream is a bit stream, in which data bits are grouped into units, called bytes.)

Computing device 2 may perform query processing for a tile-based renderer, e.g., when receiving a bit stream of video data and processing such a bit stream for rendering on, for example, a video display.

As illustrated in the example of FIG. 1, computing device 2 includes a user interface 4, a central processing unit (CPU) 6, a memory controller 8, a memory 10, a graphics processing unit (GPU) 12, a display interface 14, a display 16 and a bus 18. User interface 4, CPU 6, memory controller 8, GPU 12 and display interface 14 may communicate with each other using bus 18. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

In some examples, a processor in computing device 2, such as CPU 6, GPU 12, or other processing circuitry may perform queries as part of graphics processing on computing device 2. For example, a processor may read a running counter at the start of the query to determine a start value. The running counter may count discrete graphical entities, such as pixels, samples, polygons, etc. The processor may read the running counter at the end of the query to determine an end value. The processor may also subtract the start value from the end value to determine a result.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, a graphics application, a word processor application, an email application, a spread sheet application, a media player application, a video game application, a graphical user interface application, an operating system, or any other type of program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to render graphics data to a frame buffer for display on display 16. In some examples, the graphics rendering instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

In some examples, CPU 6 may execute software causing it to read a running counter that may count discrete graphical entities at the start of the query to determine a start value. CPU 6 may read the running counter at the end of the query to determine an end value and subtract the start value from the end value to determine a result. In some examples, discrete graphical entities may be pixels. In some other examples, discrete graphical entities may be polygons.

Memory controller 8 facilitates the transfer of data going into and out of memory 10. For example, memory controller 8 may receive memory read and write commands, and service such commands with respect to memory 10 in order to provide memory services for the components in computing device 2. Memory controller 8 is communicatively coupled to memory 10. Although memory controller 8 is illustrated in the example computing device 2 of FIG. 1 as being a processing module that is separate from both CPU 6 and memory 10, in other examples, some or all of the functionality of memory controller 8 may be implemented on one or both of CPU 6 and memory 10.

Memory 10 may store program modules and/or instructions that are accessible for execution by CPU 6 and/or data for use by the programs executing on CPU 6. For example, memory 10 may store program code and graphics data associated with the applications executing on CPU 6. Memory 10 may additionally store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of texture buffers, depth buffers, stencil buffers, vertex buffers, frame buffers, render targets, or the like. In addition, memory 10 may store command streams for processing by GPU 12. Memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium.

GPU 12 may be configured to execute commands that are issued to GPU 12 by CPU 6. The commands executed by GPU 12 may include graphics commands, draw call commands, GPU 12 state programming commands, timestamp requests, memory transfer commands, general-purpose computing commands, kernel execution commands, etc.

In some examples, GPU 12 may be configured to perform graphics operations to render one or more graphics primitives to display 16. In such examples, when one of the software applications executing on CPU 6 requires graphics processing, CPU 6 may provide graphics data to GPU 12 for rendering to display 16 and issue one or more graphics commands to GPU 12. The graphics commands may include, e.g., draw call commands, GPU 12 state programming commands, memory transfer commands, blitting commands, etc. The graphics data may include vertex buffers, texture data, surface data, etc. In some examples, CPU 6 may provide the commands and graphics data to GPU 12 by writing the commands and graphics data to memory 10, which may be accessed by GPU 12.

In some examples, GPU 12, rather than CPU 6, may execute software causing it to read a running counter that may count discrete graphical entities at the start of the query to determine a start value. GPU 12 may read the running counter at the end of the query to determine an end value and subtract the start value from the end value to determine a result. In another example query result may be output per tile by GPU 12 and later accumulated by CPU 6.

In further examples, GPU 12 may be configured to perform general-purpose computing for applications executing on CPU 6. In such examples, when one of the software applications executing on CPU 6 decides to off-load a computational task to GPU 12, CPU 6 may provide general-purpose computing data to GPU 12, and issue one or more general-purpose computing commands to GPU 12. The general-purpose computing commands may include, e.g., kernel execution commands, memory transfer commands, etc. In some examples, CPU 6 may provide the commands and general-purpose computing data to GPU 12 by writing the commands and graphics data to memory 10, which may be accessed by GPU 12.

GPU 12 may, in some instances, be built with a highly-parallel structure that provides more efficient processing of vector operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 16 more quickly than rendering the images using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may include a GPU cache, which may provide caching services for all or a portion of memory 10. In such examples, GPU 12 may use the cache to process data locally using a local storage, instead of off-chip memory. This allows GPU 12 to operate in a more efficient manner by reducing the need for GPU 12 to access memory 10 via bus 18, which may experience heavy bus traffic, during each read and write command. In some examples, however, GPU 12 may not include a separate cache, but instead utilize memory 10 via bus 18. The GPU cache may include one or more volatile or non-volatile memories or storage devices, such as, e.g., random access memory (RAM), static RAM (SRAM), dynamic RAM (DRAM), etc.

CPU 6, GPU 12, or both may store rasterized image data in a frame buffer that is allocated within memory 10. Display interface 14 may retrieve the data from the frame buffer and configure display 16 to display the image represented by the rasterized image data. In some examples, display interface 14 may include a digital-to-analog converter (DAC) that is configured to convert the digital values retrieved from the frame buffer into an analog signal consumable by display 16. In other examples, display interface 14 may pass the digital values directly to display 16 for processing.

Display 16 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 16 may be integrated within computing device 2. For instance, display 16 may be a screen of a mobile telephone handset or a tablet computer. Alternatively, display 16 may be a stand-alone device coupled to computer device 2 via a wired or wireless communications link. For instance, display 16 may be a computer monitor or flat panel display connected to a personal computer via a cable or wireless link.

Bus 18 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 18 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

The techniques described in this disclosure may, in some examples, be implemented in any of the components in computing device 2 illustrated in FIG. 1 including, e.g., CPU 6, GPU 12, and system memory 10. In some examples, the occlusion queries techniques of this disclosure may be implemented using GPU 12 and memory 10. In some examples, the techniques of this disclosure may be implemented entirely in GPU 12. In some examples, the techniques described in this disclosure may be implemented using a combination of these components to read a running counter at the start of the query to determine a start value and at the end of the query to determine an end value. One or more of these components may be used to subtract the start value from the end value to determine a result.

Figure 2:
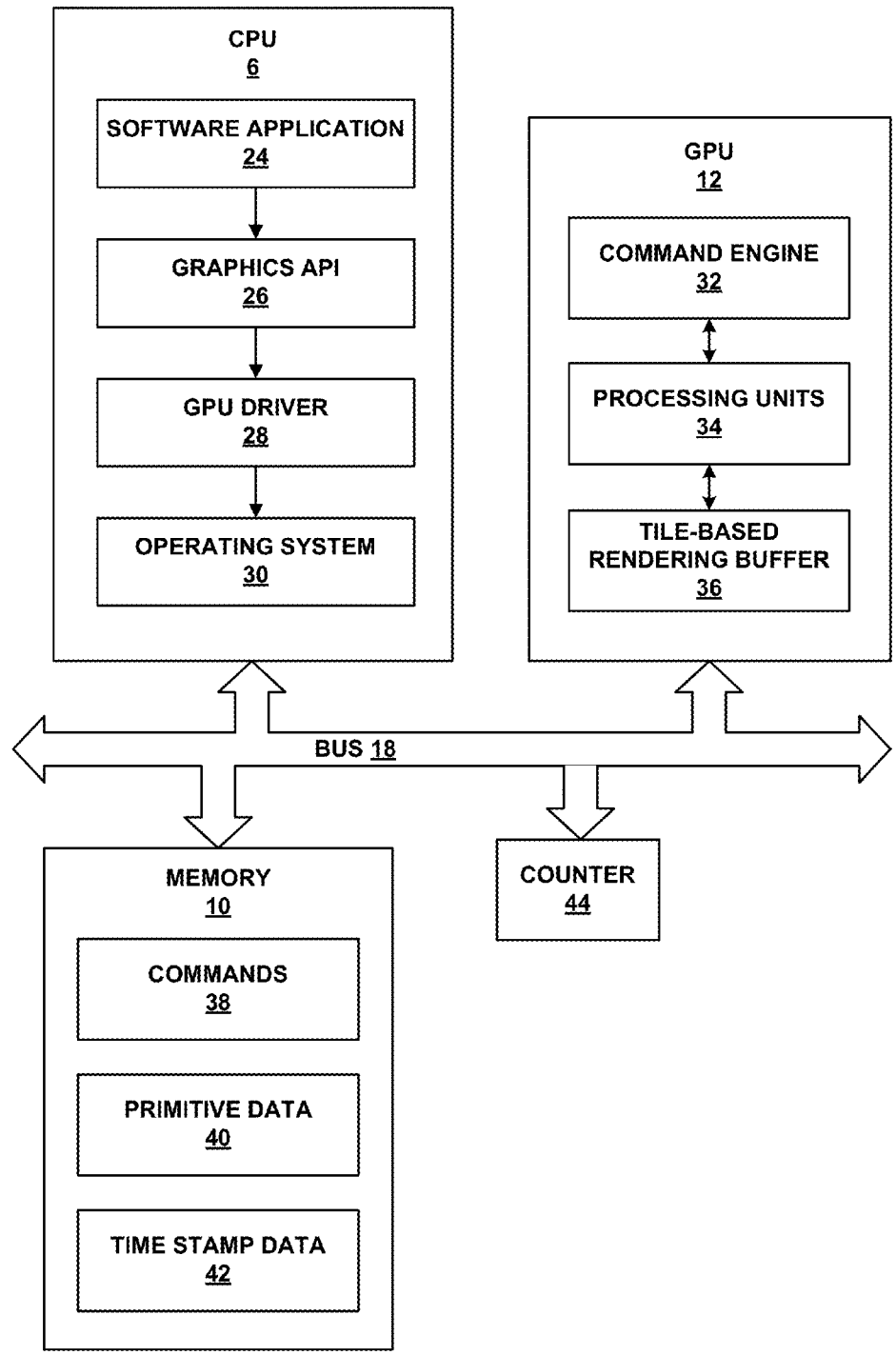
FIG. 2 is a block diagram illustrating the CPU, the GPU and the memory of the computing device shown in FIG. 1 in further detail.

FIG. 2 is a block diagram illustrating CPU 6, GPU 12 and memory 10 of computing device 2 in FIG. 1 in further detail. The techniques described in this disclosure may, in some examples, be implemented in any of the components illustrated in FIG. 2. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC).

CPU 6 may include one or more processors (e.g., microprocessors) that are configured to execute any of a software application 24, a graphics API 26, a GPU driver 28 and an operating system 30. In some examples, CPU 6 may be configured to execute instructions that cause the one or more processors of CPU 6 to perform all or part of any of the techniques described in this disclosure.

GPU 12 includes a command engine 32, one or more processing units 34, and a tile-based rendering buffer 36. The one or more processing units 34 may be configured to form a 3D graphics rendering pipeline. In some examples, one or more of processing units 34 may implement an on-chip, tessellation-enabled graphics rendering pipeline. Command engine 32 and processing units 34 may include any combination of dedicated hardware units, firmware, software, and processors that are configured to perform the functions attributed to such components. In some examples, GPU 12 may be configured to execute instructions that cause one or more processors of GPU 12 to perform all or part of any of the techniques described in this disclosure.

Memory 10 may store one or more commands 38, primitive data 40, and timestamp data 42. In some examples, memory 10 may also store instructions that, when executed, cause one or more processors to perform all or part of any of the techniques described in this disclosure.

FIG. 2 also illustrates an example counter 44 that may count discrete graphical entities. A processor, such as GPU 12 or CPU 6, may execute software causing it to read counter 44 at the start of the query to determine a start value and at the end of the query to determine an end value and subtract the start value from the end value to determine a result. In various examples, GPU 12 or CPU 6 may use memory 10 to store values read from counter 44. In other examples, registers within GPU 12 or CPU 6 or other memory (not shown) may be used. For example, counter 44 may include memory or other storage.

In the illustrated example of FIG. 2 counter 44 is connected to bus 18 and may thereby be accessed by, for example, CPU 6 and GPU 12. In other examples, counter 44 may be part of memory 10 or implemented in CPU 6 or GPU 12. Generally, the query counters for all query types are maintained by hardware. Accordingly, it is generally necessary to instruct GPU 12 to write the counter values to memory, after which CPU 6 can access it. In some examples, no software query counters are used. In such examples, the counter values for all query types may be maintained in the hardware and hardware commands may be used to cause those counter values to be written to memory. Other examples, however, may use different counter configurations, such as software counters or a combination of hardware and software counters.

It will be understood that other processing resources (not shown) might be used to implement the techniques of this disclosure by reading counter 44 at the start of the query to determine a start value and at the end of the query to determine an end value and subtracting the start value from the end value to determine a result.

In one specific example of how the techniques described herein might be implemented using the system of FIG. 2, GPU 12 may execute software causing it to read counter 44 at the start of the query to determine a start value. This start value may be stored to memory 10. GPU 12 may then read counter 44 at the end of the query to determine an end value. This end value may be subtracted from the start value stored in memory to determine a result. The end value may be stored in a register within GPU 12 or in memory 10 after it is read. The start value may be read from memory 10 and then subtracted from the end value stored in the register.

In some examples, the query counter may be maintained by the GPU. Instructions executed by the GPU may write such counter values to memory 10 where these counter values may then be accessed by CPU 6. In another specific example of how the techniques described herein might be implemented using the system of FIG. 2, CPU 6 may execute software causing it to read counter 44 at the start of the query to determine a start value. This start value may be stored to memory 10. CPU 6 may then read counter 44 at the end of the query to determine an end value. This end value may be subtracted from the start value stored in memory to determine a result. The end value may be stored in a register within CPU 6 or in memory 10 after it is read, however, generally a register in CPU 6 will be used. The start value may be read from memory 10 and then subtracted from the end value stored in the register.

In the example illustrated in FIG. 2 the processor (e.g., CPU 6 or GPU 12), the memory 10, and the counter 44 are each separate logical blocks attached to bus 18. In other examples (not shown) one or more of the functions of the processor, memory, and counter may be performed using a single functional block. For example, a processor might instruct a single functional block that may be attached to bus 18 to read a counter at the start of the query to determine a start value, store the start value to a memory within the single functional block, read counter 44 at the end of the query to determine an end value, and subtract the start value from the end value to determine a result. The end value may then be the only thing returned to the processor. In other examples, the processor may indicate the start and end of the query to the functional block and the functional lock may return the result.

The apparatus illustrated in FIG. 2 may perform various queries in accordance with the systems and methods described herein. For example, as is illustrated in more detail with respect to FIG. 7 and the memory maps of FIGS. 5-6, the apparatus of FIG. 2 may perform two queries, query ABC and query BC, one nested in another. In such a query, initially three memory locations may be reset to zero for query ABC.

Software application 24 may be a graphics application that uses GPU 12 to render one or more 3D graphics scenes and/or 3D graphics objects into an image to be displayed on a display. Software application 24 may include instructions that cause GPU 12 to rasterize and render a set of 3D graphics primitives. Software application 24 may issue the instructions to GPU driver 28 via graphics API 26. Graphics API 26 may be a runtime service that translates the instructions received from software application 24 into a format that is consumable by GPU driver 28.

GPU driver 28 receives the instructions from software application 24, via graphics API 26, and controls the operation of GPU 12 to service the instructions. For example, GPU driver 28 may formulate one or more commands 38, place the commands 38 into memory 10, and instruct GPU 12 to execute the commands 38. In some examples, GPU driver 28 may place the commands 38 into memory 10 and communicate with GPU 12 via operating system 30, e.g., via one or more system calls.

Operating system 30 may provide a software platform upon which software application 24, graphics API 26, and GPU driver 28 execute. Operating system 30 may manage the hardware details of communicating and transferring data between CPU 6, memory 10 and GPU 12.

Commands 38 may include one or more state commands, one or more draw call commands and/or one or more timestamp requests. A state command may instruct GPU 12 to change one or more of the state variables in GPU 12, such as, e.g., the primitive type. A draw call command may instruct GPU 12 to render the geometry defined by a group of one or more vertices (e.g., defined in a vertex buffer) stored in memory 10. The geometry defined by the group of one or more vertices may, in some examples, correspond to a plurality of primitives to be rendered (e.g., primitive data 40). In general, a draw call command may invoke GPU 12 to render all of the vertices stored in a defined section (e.g., buffer) of memory 10. In other words, once GPU 12 receives the draw call command, control is passed to GPU 12 for rendering the geometry and primitives represented by the vertices in the defined section (e.g., buffer) of memory 10.

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc.

A programmable shader unit may, in some examples, include a plurality of processing units that are configured to operate in parallel, e.g., a single instruction multiple data (SIMD) pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed-function processing unit may include hardware that is hard-wired to perform certain functions. Although the fixed-function hardware may be configurable, via one or more control signals, for example, to perform different functions, the fixed-function hardware typically does not include a program memory that is capable of receiving user-compiled programs. In some examples, the fixed-function processing units in processing units 34 may include, for example, processing units that perform raster operations, such as, e.g., depth testing, scissors testing, alpha blending, etc.

Tile-based rendering buffer 36 may be configured to store rasterized data for a sub-region of a render target (e.g., a tile or bin). Tile-based rendering buffer 36 may act as a temporary render target for particular sub-regions of the actual render target during the performance of the rendering pass. Tile-based rendering buffer 36 may include one or more volatile or non-volatile memories or storage devices, such as, e.g., random access memory (RAM), static RAM (SRAM), dynamic RAM (DRAM), etc. In some examples, tile-based rendering buffer 36 may be an on-chip buffer. An on-chip buffer may refer to a buffer that is formed on, located on, and/or disposed on a microchip, an integrated circuit, and/or a die that is the same as the microchip, integrated circuit, and/or die upon which GPU 12 is formed, located, and/or disposed.

In some examples, processing units 34 may access tile-based rendering buffer 36 via a first communication interface, and access the render target (e.g., a frame buffer stored in memory 10) via a second communication interface that is different than the first communication interface. In such examples, the first communication interface may have, in some examples, a higher bandwidth than the second communication interface. The second communication interface may, in some examples, correspond to bus 18 in FIG. 1 and the connection between memory controller 8 and memory 10 in FIG. 1. When the tile-based rendering buffer is an on-chip tile-based rendering buffer, the first communication interface may be a communication interface that is internal to GPU 12.

As used herein, bandwidth may refer to the rate at which a communication interface is capable of transferring data between two components, e.g., a memory component and GPU 12. The units for bandwidth may, in some examples, be given as a number of bits per unit of time, e.g., gigabits per second (Gb/s). When a bus having a bus width of multiple bits is used as part of the communication interface, the bandwidth may, in some examples, be equal to the product of the width of the bus multiplied by the rate at which data is transferred along a single bit line. For example, if a bus is 16 bits wide, and each bit line of the bus is capable of transferring data at a rate of 2 Gb/s, the bandwidth of the bus may be equal to 32 Gb/s. If multiple buses form a communication interface between two components, then the bandwidth of the communication interface may be a function of the bandwidth of each of multiple buses, e.g., the minimum bandwidth of each of the individual buses.

When tile-based rendering buffer 36 is implemented on the same chip as GPU 12, GPU 12 does not necessarily need to access tile-based rendering buffer 36 via the system and memory buses (e.g., bus 18 in FIG. 1 and the connection between memory controller 8 and memory 10 in FIG. 1), but rather may access tile-based rendering buffer 36 via an internal communication interface (e.g., a bus) implemented on the same chip as GPU 12. Because such an interface is on-chip, it may be capable of operating at a higher bandwidth than the system and memory busses. Although the above described technique is one way of achieving a communication interface for tile-based rendering buffer 36 that exceeds the bandwidth of the communication interface used to access memory 10, other techniques are possible and within the scope of this disclosure.

The capacity of tile-based rendering buffer 36 may, in some examples, be limited by the memory available on certain types of computing devices, e.g., mobile devices. Rendering buffer 36 may be fast graphics memory. Moreover, when tile-based rendering buffer 36 is implemented on the same chip as GPU 12, the amount of area available to implement tile-based rendering buffer 36 on the same chip may be limited due to the other functionality that is implemented on the chip. In some examples, tile-based rendering buffer 36 may have a bit density that is lower than the bit density of the render target further limiting the capacity of tile-based rendering buffer 36. Because of these and/or other factors, the capacity of tile-based rendering buffer 36 may, in some cases, be less than the size of the render target. Consequently, the capacity of tile-based rendering buffer 36 may, in such examples, be less than a minimum capacity needed to store pixel data for all of a plurality of destination pixels associated with a graphics image. The capacity of a memory component may refer a maximum amount of data (e.g., a maximum number of bits) capable of being stored in the memory component. The size of the render target may refer to the amount of data (e.g., the number of bits) stored in the memory range allocated to the render target. Bit density may refer to the number of bits that can be stored in a particular amount of area.

As discussed above, when performing tile-based rendering, GPU 12 may render each sub-region of a render target during a separate iteration of the rendering pass. For example, as part of a single rendering pass iteration for a particular sub-region of a render target (e.g., a particular subset of the destination pixels of the graphics image), GPU 12 may render all or a subset of the primitives with respect to the particular sub-region of the render target. As discussed above, rendering buffer 36 may be fast graphics memory. The capacity of tile-based rendering buffer 36 may be configured to be greater than or equal to the size of the sub-region of the render target. Accordingly, the rendering target may be the size of the fast graphics memory (or smaller). Therefore, during a single rendering pass iteration, all destination pixel data associated with a respective one of the sub-regions of the render target may be available in tile-based rendering buffer 36 without necessarily needing to access a frame buffer in memory 10. Consequently, during a single rendering pass iteration, GPU 12 may be able to read the destination pixel data from tile-based rendering buffer 36 via a relatively high bandwidth communication interface rather than having to read such data from memory 10 via a relatively low bandwidth communication interface.

Although some graphics systems that do not perform tile-based rendering may be capable of caching part of the frame buffer by using a hardware-based, on-chip cache, such caches do not guarantee that the destination pixel values for a given pixel will be available when needed. This is because multiple destination pixels may map to the same address in the hardware-based cache. If tile-based rendering is not used in this case, then the current state of the hardware-based cache may not necessarily include the destination pixel values associated with a currently processed primitive, but rather include destination pixel values associated with previously processed primitives in other areas of the graphics image.

In contrast to a hardware-based cache where multiple destination pixels map to the same cache location, the destination pixels stored in tile-based rendering buffer 36 for a given rendering pass iteration may, in some examples, be uniquely addressable. In other words, for a given rendering pass iteration, a one-to-one mapping may be defined between the addressable storage slots in tile-based rendering buffer 36 and the destination pixels used for that rendering pass iteration. Consequently, when performing tile-based rendering, all destination alpha values for a given tile-based rendering pass may, in some examples, be available from tile-based rendering buffer 36 via a relatively low bandwidth communication interface. Moreover, unlike the hardware-based cache systems, because of the uniquely addressable data in tile-based rendering buffer 36, cache misses do not occur, thereby alleviating the need to resort to bandwidth-expensive frame buffer accesses in the event of a cache miss.

A destination pixel may refer to pixel data stored in a render target (e.g., either a frame buffer or a corresponding tile-based rendering buffer) for a particular pixel location. In contrast, a source pixel may refer to pixel data that has been generated by a rasterization processing unit in processing units 34 and has not yet been stored to and/or merged with a render target. A destination pixel may include composited pixel data from multiple source pixels associated with different primitives.

To perform the tile-based rendering, software application 24 may, in some examples, place primitive data 40 into memory 10 that geometrically defines a set of one or more 3D graphics primitives to be rendered, and issue one or more draw call commands to GPU driver 28 via graphics API 26. The draw call commands may cause the primitives defined by primitive data 40 to be rasterized and rendered by GPU 12 into a render target (e.g., a frame buffer stored in memory 10).

In some examples, prior to issuing the draw call commands, software application 24 may configure GPU 12 to render a particular type of primitive. For example, software application 24 may issue a state command to GPU 12 that specifies the particular type of primitive to render during a draw call. In additional examples, prior to issuing the draw call commands, software application 24 may configure GPU 12 to use one or more tessellation techniques to render a primitive. For example, software application 24 may cause one or more shader programs that implement the tessellation techniques to execute on one or more shader units of GPU 12 (e.g., a hull shader unit and/or a domain shader unit) during the draw call instruction.

Primitive data 40 may include data indicative of one or more primitives to be rendered. In some cases, primitive data 40 may geometrically define the primitives to be rendered. Geometrically defining a primitive may refer to defining a primitive by a set of vertices (or control points) and corresponding vertex attributes. In some examples, primitive data 40 may take the form of a plurality of vertices, a vertex list, and/or vertex buffer. In further examples, primitive data 40 may take the form a vertex buffer in combination with an index buffer. In such examples, the vertex buffer may define the vertices, and the index buffer may specify which vertices are used to define each of the primitives.

Each of vertices included in primitive data 40 may include one or more attributes, such as, e.g., positional coordinates, normal coordinates, texture coordinates, etc. The vertices may conceptually correspond to the vertices of a geometric primitive (e.g., a point, line, triangle, etc.) and/or to the control points of a higher-order primitive (e.g., a higher-order surface such as a Bézier surface). In some case, each of the vertices may be grouped into groups of one or more vertices, and each of these groups of vertices may correspond to a single primitive.

The shape of the geometrically-defined primitive may be defined, in some examples, by additional data that is not necessarily included in primitive data 40. The additional data may include one or more of a specified primitive type from a set of one or more predetermined primitive types, one or more mathematical functions, and/or one or more tessellation techniques.

In some examples, the specified primitive type may be stored as a rendering state variable in GPU 12 and may be configurable by software application 24. The specified primitive type may, in some cases, define the shape of the resulting rendered primitives (e.g., points, lines, triangles, etc.) and/or the connectivity of the vertices included in primitive data 40 (e.g., triangle strip, triangle fan, etc.). In some examples, the different primitive types may correspond to a set of primitive topologies that the graphics pipeline implemented by processing units 34 is capable of processing. In further examples, the different primitive types may correspond to the set of primitive topologies that are defined by graphics API 26 and are available for use by software application 24.

The one or more mathematical functions and/or the one or more tessellation techniques may be specified in one or more shader programs that are configured to execute on one or more shader units of GPU 12 (e.g., a hull shader unit and/or domain shader unit). The mathematical functions may be used to define primitives that have curved lines and/or curve surfaces. The one or more tessellation techniques may be used to define a primitive by a plurality of tessellated primitives that approximate the shape and/or curvature of an input primitive.

In response to receiving a draw call command from software application 24, GPU driver 28 may cause GPU 12 to perform tile-based rendering based on the plurality of primitives to be rendered (e.g., primitive data 40). For example, GPU driver 28 may cause GPU 12 to perform a binning pass and rendering pass that includes a plurality of rendering pass iterations. During the binning pass, GPU 12 may determine to which of a plurality of sub-regions, e.g., bins or tiles of a render target each of the primitives contributes image data (e.g., pixel data), and generate binning data (e.g., data from the bins or tiles) that indicates to which of the plurality of sub-regions of a render target each of the primitives contributes image data (e.g., pixel data). Once the binning data has been generated, GPU 12 may perform the rendering pass that includes the plurality of rendering pass iterations based on the binning data and the primitive data 40 to generate a composite, rasterized version of the primitives.

In some examples, in order to perform the binning pass, the rasterizer in GPU 12 may be configured to perform low-resolution z-buffering and/or back-face culling on the primitives to be rasterized. In such examples, the binning data may be generated based on primitives that are visible after z-buffering and/or back-face culling.

In some cases, the rendered primitives may be stored as a plurality of pixels. Each of the pixels may be associated with one or more spatial locations of the render target, and may include one or more attributes indicative of the color of the respective pixel. In some cases, each of the pixels may further include one or more attributes indicative of the transparency of the pixel. In some examples, the pixel data may include Red, Green, Blue, and Alpha (RGBA) attributes for each pixel where the "RGB" components correspond to color values and the "A" component corresponds to an alpha value.

The techniques described in this disclosure may be implemented in any of the components shown in FIG. 2 including, e.g., software application 24, graphics API 26, GPU driver 28, command engine 32 and processing units 34. For example, GPU driver 28, command engine 32, and/or processing units 34 may be configured to.

In other examples, GPU 12, rather than CPU 6, may execute software causing it to read a running counter that may count discrete graphical entities at the start of the query to determine a start value. GPU 12 may read the running counter at the end of the query to determine an end value and subtract the start value from the end value to determine a result.

In some examples the start value may be stored in a first memory location, e.g., in memory 10. The end value may be stored in a second memory location, e.g., in memory 10. The result may be stored in a third memory location e.g., in memory 10.

In another example, the start value may be stored in a first memory location, e.g., in memory 10. The end value may be stored in a second memory location, e.g., in memory 10. The result may overwrite one of the first or second memory location.

Some examples may further include nesting a second query. Nesting may be done by reading the running counter at the start of the second query to determine a second start value, reading the running counter at the end of the second query to determine a second end value, and subtracting the second start value from the second end value to determine a result.

Figure 3:
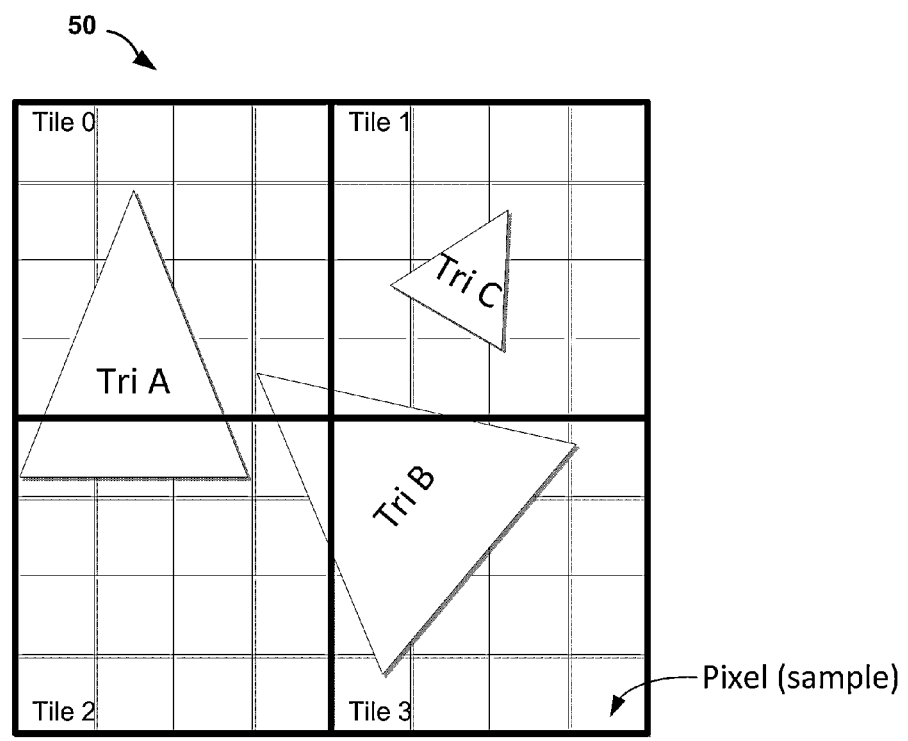
FIG. 3 is a conceptual diagram illustrating tile-based rendering.

FIG. 3 is a conceptual diagram illustrating tile-based rendering. As discussed above, binning or tile-based rendering may provide a way to render a 3D scene in smaller parts called "tiles" or "bins." As discussed above, tile based rendering may be used to exploit local spatial coherence in the scene, to facilitate the use of limited hardware rendering resources later in the graphics pipeline, or both. Generally, in tiled based rendering is system, apparatus, or device, such as a computer graphics device may divide a frame into, for example a regular grid. The grid forms tiles, which are portions of the frame or other region. In an example, each tile or bin may be rendered using the same rendering command stream.

In the tile-based rendering example of FIG. 3, rendering commands for drawing polygons, e.g., triangles, Tri A, Tri B and Tri C, may be executed four times, e.g., once for every tile. In an example that uses a hardware counter, such as an occlusion query counter, hardware commands to reset, start and stop occlusion query counters, may be executed for each tile only if no nesting is used. In some examples, if a software counter is used, software commands may perform these operations. In some examples, in accordance with the techniques of this disclosure, nested occlusion queries may be allowed so, for example, hardware reset of the counter in every tile may not be allowed because this may impact a nested query or queries by resetting the counter in the middle of counting the one or more other queries. For example, assume a first query is started and that the counter used for the query is reset at the start of the query. Further, assume that a second query is started before the end of the first query. The second query is said to be a nested query because it is started while the first query is still being performed. If a single counter is used for both queries and counter is reset at the start of the second query, then the value read from the counter at the end of the first query will likely be incorrect. For example, the value read may typically be too small.

In some examples, systems, methods, and devices implementing these techniques may need to store a start and end counter value for each tile. These values may be stored in memory, registers, or some other storage. For example, the start value may be stored in memory 10, a register, or some other memory or storage location. The end value may also be stored in memory 10, a register, or some other memory or storage location. In another example, the start value may be stored in a first memory location, e.g., in memory 10. The end value may be stored in a second memory location, e.g., in memory 10. The result may be stored in a third memory location e.g., in memory 10. In another example, the start value may be stored in a first memory location, e.g., in memory 10. The end value may be stored in a second memory location, e.g., in memory 10. The result may overwrite one of the first or second memory locations. In yet another example, the start value may be stored in a first memory location, e.g., in memory 10. The end value may be stored in a register. The result may be stored in the first memory location.

Tile-based rendering may, in some examples, involve subdividing a render target into a plurality of sub-regions (e.g., bins or tiles), and performing a rendering pass that includes a separate rendering pass iteration for each of the sub-regions of the render target. To reduce the number of primitives that need to be processed during the rendering pass, a binning pass may, in some examples, be performed prior to the rendering pass. The binning pass may be used to generate binning data that indicates to which of a plurality of sub-regions of a render target each of the primitives to be rendered contributes pixel data. The binning data may be used during the rendering pass iterations to selectively render primitives that contribute to sub-regions that are active during particular rendering pass iterations, thereby reducing the number of primitives that need to be processed during the rendering pass.

Rendering may refer to the process of converting 3D graphics primitives that correspond to 3D objects in a graphics scene into 2D rasterized image data. Rendering typically takes place with respect to a render target (e.g., a frame buffer), which is usually updated as each of the graphics primitives in the scene is rendered. Therefore, not only does the render target store the final 2D rasterized image data for a graphics scene, but the render target may also store intermediate data as the graphics scene is rendered. The 2D rasterized image data stored in the render target may include a plurality of pixels where each of the pixels includes color data, transparency data, and/or depth data. As each new primitive is rendered into the render target, the 2D rasterized image data of the new primitive is merged with the existing intermediate data that is already stored in the render target for the previously rendered primitives.

To merge the data in the render target, the intermediate data typically needs to be read from the render target prior to writing the new data to the render target. Therefore, rendering may involve the performance of numerous read and write operations with respect to a memory that contains the render target, thereby resulting in high memory bandwidth usage. Because of the high memory bandwidth usage, it is desirable to use a dedicated, high-bandwidth, on-chip memory for the render target. However, in area-limited applications, such as, e.g., mobile applications, there may not be enough available area to implement a high-bandwidth, on-chip memory that is able to simultaneously hold all of the data for each of the pixels in the render target.

Tile-based rendering may address the above-mentioned issues by subdividing a render target into a plurality of sub-regions (e.g., tiles or bins), and performing a rendering pass that includes a separate rendering pass iteration for each of the sub-regions. Each of the sub-regions may correspond to a subset of the pixels in the render target (e.g., a 16×16 tile of pixels). During each of the rendering pass iterations, all of the image data associated with the corresponding sub-region may be rendered, which may include rendering each of the primitives that contributes pixel data to the sub-region. A high-bandwidth, on-chip memory that is large enough to store the data for a single sub-region of the render target may be used as a local render target for each of the rendering pass iterations, and after a rendering pass iteration has completed, the contents of the local render target for the rendering pass iteration may be transferred to the general render target stored in a low-bandwidth, off-chip system memory. By performing separate rendering pass iterations on a per-tile basis, tile-based rendering schemes may be able to allow a high-bandwidth, on-chip memory to be used for merging rasterized image data even in area-limited applications that do not allow for large on-chip memories.

One approach for performing tile-based rendering is to perform a rendering pass iteration for each of the sub-regions of the render target, and during each of the rendering pass iterations, render all of the primitives in the scene while using different scissors settings to limit the output to a particular sub-region that is currently being rendered. Such an approach, however, may be inefficient because each of the primitives is rendered in each of the rendering pass iterations regardless of whether or not the primitive is actually visible in the rendered sub-region.

In order to improve the efficiency of tile-based rendering, a binning pass may, in some examples, be performed prior to the performance of the rendering pass. The binning pass may be used to determine binning data for the primitives. For each of the primitives to be rendered, the binning data may indicate with respect to which of the sub-regions of the render target each of the primitives contribute pixel data.

Figure 4:
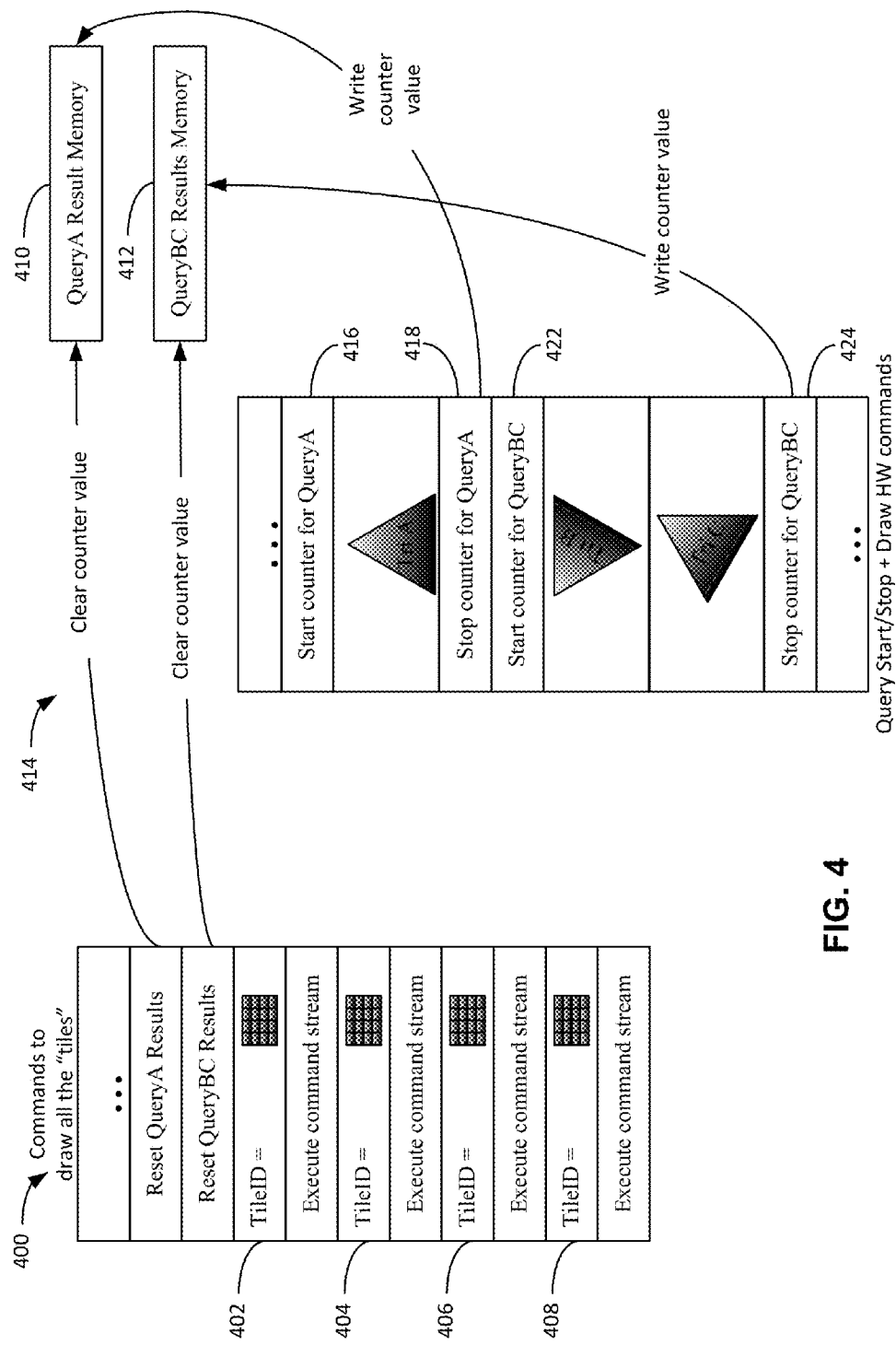
FIG. 4 is a conceptual diagram illustrating an example occlusion query.

FIG. 4 is a conceptual diagram illustrating an example occlusion query 400. In the illustrated example of FIG. 4, the query result may be output per tile by GPU 12 and later accumulated by CPU 6. The amount of memory needed to store this intermediate per-tile result increases linearly with the increase in the number of tiles and it also increases the amount of time taken by CPU 6 to do the accumulation. FIG. 4 illustrates 4 bins or tiles 402, 404, 406, 408. As illustrated in FIG. 4 memory location 410 for query result A and memory location 412 for query result BC may be reset, i.e., the counter values may be cleared 414. A counter may be started 416 for query A and then stopped when query A 418 is completed. The results from the counter may be written to the memory location 410 for query A. Similarly, a counter (the same counter in some examples) may be started 422 for query BC and then stopped 424 when query BC is completed. The results from the counter may be written to the memory location 412 for query BC. In such an example, the amount of memory needed to store an intermediate per-tile results in a query such as an occlusion query may increase linearly with an increase in the number of tiles. An increase in the number of tiles also increases the amount of time taken by the CPU to do the accumulation. In some examples, a more memory and time efficient way to perform such queries may read a running counter at the start of a query to determine a start value, wherein the running counter counts discrete graphical entities, read the running counter at the end of the query to determine an end value, and subtracting the start value from the end value to determine a result.

FIGS. 5 and 6 illustrate memory maps 500, 600 for example queries ABC and BC. FIG. 5 is a conceptual diagram illustrating an example memory map 500. In the illustrated example of FIG. 5, the query result may be output per tile by GPU 12 and later accumulated by CPU 6. As illustrated in FIG. 5, memory map 500 may include multiple memory locations for each tile 402, 404, 406, 408 and each query, e.g., Query ABC and Query BC. For example, in the illustrated example of FIG. 5, Query ABC includes start and end values for each tile and query BC includes start and end values for each tile. Accordingly, the amount of memory in the memory map for each query increases linearly with the increase in the number of tiles and it also increases the amount of time taken by CPU 6 to do the accumulation when the final result is requested by the application. For example, for each query, CPU 6 may need to subtract each bin/tile start value from the corresponding bin/tile stop value and perform an accumulation for each of these results.

At the start of a query, the three memory locations for query ABC and the three memory locations for query BC may be reset to zero. A query counter start value for query ABC (value SABC) may be written to a query counter start value portion of query ABC memory. In some examples, this may be by hardware commands.

Query BC may be a nested query in one example. A query counter start value for query BC (value SBC) may be written to query counter start value of query BC memory. A query end value for query ABC (value EABC) may be written to query counter end value of query ABC memory. An accumulation may be performed and the result may be written to the accumulate final result memory location of Query ABC memory. Similarly, hardware commands may writes a query counter end value for query BC (value EBC) to the query counter end value memory location of query BC memory. An accumulate may be performed and the result may be written to the accumulate final results memory location of QueryBC memory.

FIG. 6 is a conceptual diagram illustrating example memory map 600 according to this disclosure. As illustrated, only three memory locations are used for each query. For each query a start value may be stored. For example, at the start of a particular query the value of a running counter may be written to the corresponding start memory location for that query. At the end of a query the running counter value may be written to the corresponding end memory location for that query. The difference may also be calculated and written to the corresponding memory location to store the final result for that query. Other examples might use only one or two memory locations for each query. For example, the final result value might be written over the memory location for one or both of the corresponding start and stop memory locations to provide for a system that might only use two memory locations. Alternatively, if for example, a read from the running counter and a difference between a memory location and the running counter can be performed in a single clock cycle a single memory location might store the start and then be over written with the difference value such that a single memory location may be used for each query. In other examples, temporary memory locations or registers might be used to store, for example, end values such that mathematical operations to determine difference values may be performed without using dedicated memory locations for each stop value. In an example, the difference may also be calculated by GPU 12 and accumulated in a corresponding memory location.

As described above, the systems and methods described herein may perform various queries, such as occlusion query, timestamp query, pipeline status query (pipeline stats), etc. For example, these systems and methods may perform two queries, query ABC and query BC, one nested in another. It will be understood that three or more nested queries are also possible.

In the example of two queries, with one nested in another, may be performed. In the example, three memory locations may be reset to zero for query ABC. For example, as illustrated in FIG. 6, the memory locations in QueryABC Result Memory for Occlusion Query Counter Start Value, Occlusion Query Counter End Value, and Accumulated Final Result may be reset to zero for query ABC. Three memory locations may also be reset to zero for query BC. For example, as illustrated in FIG. 6, the memory locations in QueryBC Result Memory for Occlusion Query Counter Start Value, Occlusion Query Counter End Value, and Accumulated Final Result may be reset to zero for query BC. When a query for triangles ABC begins a counter start value for query ABC (value SABC) may be written to a query counter start value portion of query ABC. This may be by writing to memory using hardware commands. For example, as illustrated in FIG. 6, a start value may be written to QueryABC Result Memory locations Occlusion Query Counter Start Value.

Query BC may be a nested query in one example. A query counter start value for query BC (value SBC) may be written to query counter start value of query BC memory, i.e., Query Counter Start Value of QueryBC Result Memory. In one example QueryABC may end before Query BC. Accordingly, a query end value for query ABC (value EABC) may be written to Occlusion Query Counter End Value of QueryABC Result Memory. An accumulation may be performed, e.g., by a processor, such as CPU 6 or GPU 12, and the result may be written to the Accumulate Final Result memory location of QueryABC memory. Similarly, when query BC is complete, hardware commands may writes a query counter end value for query BC (value EBC) to the Query Counter End Value memory location of QueryBC Result Memory. An accumulate may be performed, e.g., by a processor, such as CPU 6 or GPU 12, and the result may be written to the Accumulate Final Results memory location of QueryBC Result Memory.

Figure 7:
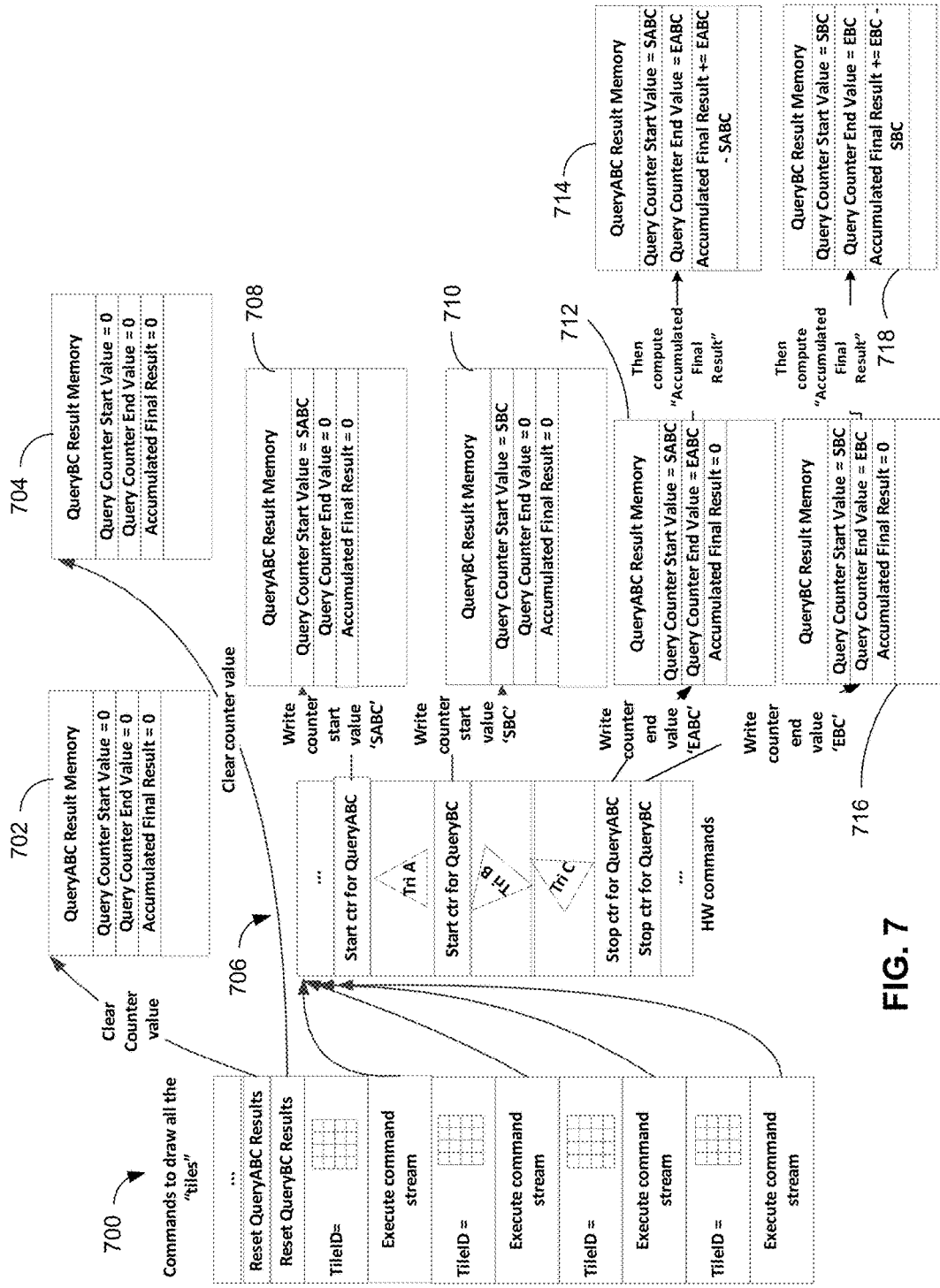
FIG. 7 is a conceptual diagram illustrating example occlusion query in accordance with the techniques of this disclosure.

FIG. 7 is a conceptual diagram illustrating an example occlusion query in accordance with the techniques of this disclosure. In the illustrated example of FIG. 7, the commands to draw all the "tiles," box 700 includes four bins or tiles. Queries for ABC and BC are illustrated in the example of FIG. 7. Initially three memory locations are reset to zero at 702 for query ABC. Three memory locations are also reset to zero at 704 for query BC. A query counter start value for query ABC (value SABC) is written to a query counter start value portion of query ABC memory. This may be written using hardware commands 706 at 708. It will be understood that in some examples, hardware commands 706 may be replaced by software or some combination of hardware and software.

Query BC is a nested query in the illustrated example of FIG. 7. Hardware commands 706 write a query counter start value for query BC (value SBC) to query counter start value of query BC memory at 710. Hardware commands 706 write a query end value for query ABC (value EABC) to query counter end value of query ABC memory at 712. An accumulation may be performed using, e.g., hardware commands and written to the accumulate final result memory location of Query ABC memory at 714. Similarly, hardware commands 706 writes a query counter end value for query BC (value EBC) to the query counter end value memory location of query BC memory at 716. An accumulate may be performed and written to the accumulate final results memory location of QueryBC memory at 718.

As described above, other examples might use only one or two memory locations for each query. For example, in a two-memory location implementation, initially two memory locations are reset to zero rather than three for query ABC and two memory locations are also reset to zero for query BC. A query counter start value for query ABC (value SABC) is written to a query counter start value portion of query ABC memory. This may be by hardware command.

For query BC hardware commands (or software in some examples) write a query counter start value for query BC (value SBC) to query counter start value of query BC memory and a query end value for query ABC (value EABC) to query counter end value of query ABC memory. An accumulation may be performed and written to one or both of the start or stop memory locations for query ABC. Similarly, hardware commands write a query counter end value for query BC (value EBC) to query counter end value of query BC memory. An accumulate may be performed and written to one or both of the start or stop memory locations for query BC. Another example may use two memory locations by saving a start counter value to memory. In such an example, an end counter value is not stored in memory but directly subtracted from the start counter value memory location. The accumulated result (result of the subtraction) may then be stored to memory.

Similarly, in some examples, a single memory location or a single dedicated memory location might be used for each query. For example, a temporary memory or register might be used to store counter end values and results may be written to the same memory location as the corresponding counter start value. In other examples, a read of a counter and a difference operation from a value in memory may allow for the use of a single memory location. This may be done by storing a counter start value and then later reading an stop counter value, performing a difference operation of the start and stop counter values and over writing the start counter value with the result in a single operation. It will be understood that other configurations are also possible using various dedicated memory locations for a query in combination with temporary memory locations to, for example, calculate various results.

In some examples, a temporary register may hold a counter start value and the end counter value might not be stored to memory either. The start counter register value may be directly subtracted from the end counter value and then only the final accumulated result is stored in a memory location.

In one example, some systems, methods, and devices may include a start memory location, but not store an end counter value to memory. The end value may be directly subtracted. For example, the start counter value stored in the start memory location may be subtracted from the end counter value and saved to a second memory location. Thus, such an example may use two memory locations.

Another example may use one memory location. Such an example may not store the start counter value. Rather, a register may be used instead. The end counter value might also not be stored, but rather the start value in the register may be subtracted from the end value without saving the end value to memory. The accumulated result may then be stored to memory.

In one example of the disclosure, a system, method, or apparatus may perform a query and obtain an accumulation result using only three memory locations per query irrespective of the number of tiles that comprises the 3D scene. Furthermore, accumulation of the per-tile-result may be done by GPU 12 as it processes each tile. After the last tile is processed by GPU 12 the final accumulated result may already be available.

In another example, a system, method, or apparatus may obtain a query result using only two or fewer memory locations per query irrespective of the number of tiles that comprises the 3D scene. Similarly, to the above example, accumulation of the per-tile-result may be done by GPU 12 as it processes each tile. Again, after the last tile is processed by GPU 12 the final accumulated result may already be available.

In some examples, rendering commands for drawing Tri A, Tri B and Tri C of FIG. 3 will be executed four times—once for every tile. Hardware commands to reset, start, and stop the occlusion query counters, and commands to write out the counter values may be executed for each tile.

In some examples, nested occlusion queries may be allowed. Because of this it may not be possible to reset the counter, e.g., hardware or software counter, in every tile. An example may need to store a start and end counter value per tile.

In an example, query processing may be more memory efficient. Some examples may maintain just three, two, or even one memory locations per query depending on the mathematical processing capabilities of, for example, a processor implementing the techniques of this disclosure.

For example, some systems, methods, or apparatus may perform occlusion queries in a graphics processing system. This may include reading a running counter at the start of the occlusion query to determine a start value. This start value may be stored in a first memory location. In an example, the running counter counts discrete graphical entities. The example systems, methods, or apparatuses of this disclosure may read the running counter at the end of the occlusion query to determine an end value. This end value may be stored in a second memory location. Additionally, these systems, methods, or apparatus may subtracting the start value from the end value to determine a result. This value may be stored in a third memory location. In another example, the start value may be stored in a first memory location. Additionally, the end value may be stored in a second memory location, and the value determined from the subtraction of the start value from the end value, i.e., the result may be stored in one or more of the first and second memory locations, thus only requiring two memory locations. In yet another example, if a count value may be read and processed in one-step, the start value may be stored in a first memory location. The end count value may be read and the two values processed in a single step with the result possibly being stored in the first memory location, thus only requiring one memory location.

In some examples, result accumulation may be performed by GPU 12 (instead of CPU 6) as each tile is processed. After all tiles are rendered the final query result is available in, e.g., the "Accumulated Final Result" memory location.

An example method of performing occlusion queries in a graphics processing system may include reading a running counter at the start of the occlusion query to determine a start value. The running counter may count discrete graphical entities. The method may include reading the running counter at the end of the occlusion query to determine an end value and subtracting the start value from the end value to determine a result. The discrete graphical entities may be pixels or polygons.

In an example the start value is stored in a first memory location, the end value is stored in a second memory location, and the result is stored in a third memory location. In another example, the start value is stored in a first memory location, the end value is stored in a second memory location, and the result is overwrites one of the first or second memory location.

In an example, nesting a second occlusion query may be performed by (1) reading the running counter at the start of the second occlusion query to determine a second start value, (2) reading the running counter at the end of the second occlusion query to determine a second end value, and (3) subtracting the second start value from the second end value to determine a result.

One or more of these example methods may be combined. Additionally, various devices, systems, and apparatus may implement these methods.

Figure 8:
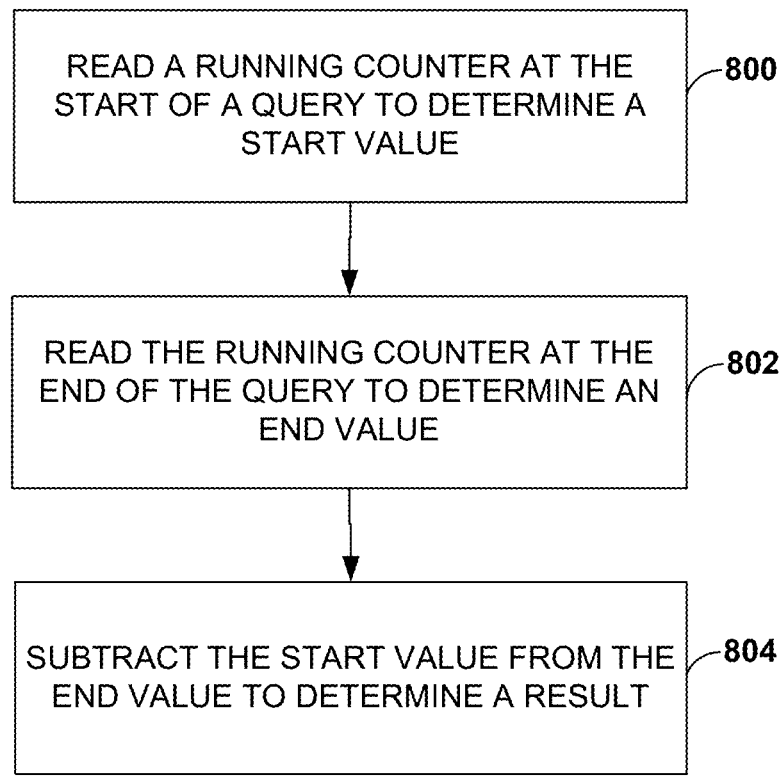
FIG. 8 is a flow diagram illustrating an example method implementing one or more aspects of this disclosure.

FIG. 8 is a flow diagram illustrating an example method implementing one or more aspects of this disclosure. A processor, such as GPU 12, CPU 6, or other processing logic may execute software causing it to read counter 44 at the start of the query to determine a start value (800). The counter 44 (FIG. 2) may be a running counter that counts discrete graphical entities. Counter 44 may be connected to bus 18 and may thereby be accessed by the processor. In other examples, counter 44 may be part of memory 10.

As discussed above, in various examples, the processor (e.g., GPU 12 or CPU 6) may use memory 10 to store values read from counter 44, such as the start value. For example, the start value may be stored in memory 10, a register, or some other memory or storage location. In one example, when a query begins a counter start value for the query may be read. This value may then be written to a query counter start value portion of a query memory. For example, as illustrated in FIG. 6, a start value may be written to QueryABC Result Memory locations Occlusion Query Counter Start Value.

The software may also cause the processor to read counter 44 at the end of the query to determine an end value (802). Additionally, the end value may also be stored in memory 10, a register, or some other memory or storage location. For example, query end value for query ABC (value EABC) may be written to Occlusion Query Counter End Value of QueryABC Result Memory of FIG. 6. An accumulation may be performed, e.g., by a processor, such as CPU 6 or GPU 12, and the result may be written to the Accumulate Final Result memory location of QueryABC memory. Similarly, when query BC is complete, hardware commands may writes a query counter end value for query BC (value EBC) to the Query Counter End Value memory location of QueryBC Result Memory. An accumulate may be performed, e.g., by a processor, such as CPU 6 or GPU 12, and the result may be written to the Accumulate Final Results memory location of QueryBC Result Memory.

Counter 44 may have increased between the start value and the end value by the number of discrete graphical entities that have been processed since the start of the query. The difference between these two values indicates the number of counts that have occurred during the query. Accordingly, the software may also cause the processor to subtract the start value from the end value to determine a result (804). For example, the start value may be read from memory 10 and then subtracted from the end value, which might be stored in a register. The end value may be stored in memory 10, a register, or some other memory or storage location.

In some examples, the start value may be stored in a first memory location, e.g., in memory 10. The result may be stored in a third memory location e.g., in memory 10. In another example, the start value may be stored in a first memory location, e.g., in memory 10. The end value may be stored in a second memory location, e.g., in memory 10. The result may overwrite one of the first or second memory locations.

Some examples may further include nesting a second query. Nesting may be done by reading the running counter at the start of the second query to determine a second start value, reading the running counter at the end of the second query to determine a second end value, and subtracting the second start value from the second end value to determine a result.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of performing queries in a graphics processing system, the method comprising:

issuing a plurality of tile-based rendering queries as part of commands to a graphics processing unit (GPU) to draw all tiles of a frame, wherein the plurality of tile-based rendering queries includes a first tile-based rendering query and a second tile-based rendering query, wherein the first tile-based rendering query is associated with a plurality of primitives, and wherein the second tile-based rendering query is associated with a subset of primitives of the plurality of primitives associated with the first tile-based rendering query;

allocating a plurality of accumulate final result memory locations for the plurality of tile-based rendering queries, wherein the plurality of accumulate final result memory locations comprises a first accumulate final result memory location allocated to the first tile-based rendering query, and a second accumulate final result memory location allocated to the second tile-based rendering query; and for the first tile-based rendering query:
reading a running counter at the start of the first tile-based rendering query to determine a first start value, wherein the running counter counts discrete graphical entities;
reading the running counter at the end of the first tile-based rendering query to determine a first end value;
subtracting the first start value from the first end value to determine a result indicating a number of discrete graphical entities of the plurality of primitives associated with the first tile-based rendering query; and
adding the result to an accumulator value stored in the first accumulate final result memory location allocated to the first tile-based rendering query; and for the second tile-based rendering query:
reading the running counter that is also read for the first tile-based rendering query at the start of the second tile-based rendering query to determine a second start value;
reading the running counter at the end of the second tile-based rendering query to determine a second end value;

subtracting the second start value from the second end value to determine a second result indicating a number of discrete graphical entities of the subset of primitives associated with the second tile-based rendering query; and adding the second result to an accumulator value stored in the second accumulate final result memory location allocated to the second tile-based rendering query;

wherein, during processing of a particular tile, the determining of the second start value and second end value is nested within the determining of the first start value and first end value.

2. The method of claim 1, wherein the discrete graphical entities of the plurality of primitives associated with the first tile-based rendering query comprise pixels of the plurality of primitives, and wherein the discrete graphical entities of the subset of primitives associated with the second tile-based rendering query comprise pixels of the subset of primitives.

3. The method of claim 1, wherein the discrete graphical entities of the plurality of primitives associated with the first tile-based rendering query comprise the plurality of primitives, and wherein the discrete graphical entities of the subset of primitives associated with the second tile-based rendering query comprise the subset of primitives.

4. The method of claim 1, wherein the first start value is stored in a first memory location separate from the first accumulate final result memory location, and wherein the first end value is stored in a second memory location separate from the first accumulate final result memory location.

5. The method of claim 1, wherein the first start value is stored in a first memory location to the first tile-based rendering query, wherein the first end value is stored in a second memory location to the first tile-based rendering query, and wherein the accumulator value is overwritten to one of the first memory location or the second memory location.

6. The method of claim 1, further comprising executing the second tile-based rendering query as a nested query within the first tile-based rendering query.

7. The method of claim 1, wherein the first tile-based rendering query comprises an occlusion query.

8. An apparatus for performing queries in a graphics processing system, the apparatus comprising:

a memory configured to store graphics data; and a graphics processing unit (GPU) in communication with the memory, the GPU configured to:

receive a plurality of tile-based rendering queries as part of commands to draw all tiles of a frame, wherein the plurality of tile-based rendering queries includes a first tile-based rendering query and a second tile-based rendering query, wherein the first tile-based rendering query is associated with a plurality of primitives, and wherein the second tile-based rendering query is associated with a subset of primitives of the plurality of primitives associated with the first tile-based rendering query;

allocate a plurality of accumulate final result memory locations for the plurality of tile-based rendering queries, wherein the plurality of accumulate final result memory locations comprises a first accumulate final result memory location allocated to the first tile-based rendering query, and a second accumulate final result memory location allocated to the second tile-based rendering query; and for the first tile-based rendering query:

read a running counter at the start of the first tile-based rendering query to determine a first start value, wherein the running counter counts discrete graphical entities;

read the running counter at the end of the first tile-based rendering query to determine a first end value;

subtract the first start value from the first end value to determine a result indicating a number of discrete graphical entities of the plurality of primitives associated with the first tile-based rendering query; and add the result to an accumulator value stored in the first accumulate final result memory location allocated to the first tile-based rendering query; and for the second tile-based rendering query:

read the running counter that is also read for the first tile-based rendering query at the start of the second tile-based rendering query to determine a second start value;

read the running counter at the end of the second tile-based rendering query to determine a second end value;

subtract the second start value from the second end value to determine a second result indicating a number of discrete graphical entities of the subset of primitives associated with the second tile-based rendering query; and add the second result to an accumulator value stored in the second accumulate final result memory location allocated to the second tile-based rendering query;

wherein, during processing of a particular tile, the determining of the second start value and second end value is nested within the determining of the first start value and first end value.

9. The apparatus of claim 8, wherein the discrete graphical entities of the plurality of primitives associated with the first tile-based rendering query comprise pixels of the plurality of primitives, and wherein the discrete graphical entities of the subset of primitives associated with the second tile-based rendering query comprise pixels of the subset of primitives.

10. The apparatus of claim 8, wherein the discrete graphical entities of the plurality of primitives associated with the first tile-based rendering query comprise the plurality of primitives, and wherein the discrete graphical entities of the subset of primitives associated with the second tile-based rendering query comprise the subset of primitives.

11. The apparatus of claim 8, wherein the GPU is further configured to execute the second tile-based rendering query as a nested query within the first tile-based rendering query.

12. The apparatus of claim 8, wherein the first tile-based rendering query comprises an occlusion query.

13. An apparatus for performing queries in a graphics processing system, the apparatus comprising:

means for issuing a plurality of tile-based rendering queries as part of commands to a graphics processing unit (GPU) to draw all tiles of a frame, wherein the plurality of tile-based rendering queries includes a first tile-based rendering query and a second tile-based rendering query, wherein the first tile-based rendering query is associated with a plurality of primitives, and wherein the second tile-based rendering query is associated with a subset of primitives of the plurality of primitives associated with the first tile-based rendering query;

means for allocating a plurality of accumulate final result memory locations for the plurality of tile-based rendering queries, wherein the plurality of accumulate final result memory locations comprises a first accumulate final result memory location allocated to the first tile-based rendering query, and a second accumulate final result memory location allocated to the second tile-based rendering query; and for the first tile-based rendering query:
 means for reading a running counter at the start of the first tile-based rendering query to determine a first start value, wherein the running counter counts discrete graphical entities;
 means for reading the running counter at the end of the first tile-based rendering query to determine a first end value;
 means for subtracting the first start value from the first end value to determine a result indicating a number of discrete graphical entities of the plurality of primitives associated with the first tile-based rendering query; and
 means for adding the result to an accumulator value stored in the first accumulate final result memory location allocated to the first tile-based rendering query; and for the second tile-based rendering query:
 means for reading the running counter that is also read for the first tile-based rendering query at the start of the second tile-based rendering query to determine a second start value;
 means for reading the running counter at the end of the second tile-based rendering query to determine a second end value;
 means for subtracting the second start value from the second end value to determine a second result indicating a number of discrete graphical entities of the subset of primitives associated with the second tile-based rendering query; and
 means for adding the second result to an accumulator value stored in the second accumulate final result memory location allocated to the second tile-based rendering query;

wherein, during processing of a particular tile, the determining of the second start value and second end value is nested within the determining of the first start value and first end value.

14. The apparatus of claim 13, wherein the discrete graphical entities of the plurality of primitives associated with the first tile-based rendering query comprise pixels of the plurality of primitives, and wherein the discrete graphical entities of the subset of primitives associated with the second tile-based rendering query comprise pixels of the subset of primitives.

15. The apparatus of claim 13, wherein the discrete graphical entities of the plurality of primitives associated with the first tile-based rendering query comprise the plurality of primitives, and wherein the discrete graphical entities of the subset of primitives associated with the second tile-based rendering query comprise the subset of primitives.

16. The apparatus of claim 13, further comprising means for storing the first start value in a first memory location separate from the first accumulate final result memory location, and means for storing the first end value in a second memory location separate from the first accumulate final result memory location.

17. The apparatus of claim 13, further comprising means for storing the first start value in a first memory location, means for storing the first end value in a second memory location, and means for overwriting the accumulator value to one of the first memory location or the second memory location.

18. A computer-readable storage medium having stored thereon instructions that, when executed, cause one or more processors of a device to:
 issue a plurality of tile-based rendering queries as part of commands to draw all tiles, wherein the plurality of tile-based rendering queries includes a first tile-based rendering query and a second tile-based rendering query, wherein the first tile-based rendering query is associated with a plurality of primitives, and wherein the second tile-based rendering query is associated with a subset of primitives of the plurality of primitives associated with the first tile-based rendering query;
 allocate a plurality of accumulate final result memory locations for the plurality of tile-based rendering queries, wherein the plurality of accumulate final result memory locations comprises a first accumulate final result memory location allocated to the first tile-based rendering query, and a second accumulate final result memory location allocated to the second tile-based rendering query; and for the first tile-based rendering query:
 read a running counter at the start of the first tile-based rendering query to determine a first start value, wherein the running counter counts discrete graphical entities;
 read the running counter at the end of the first tile-based rendering query to determine a first end value;
 subtract the first start value from the first end value to determine a result indicating a number of discrete graphical entities of the plurality of primitives associated with the first tile-based rendering query; and
 add the result to an accumulator value stored in the first accumulate final result memory location allocated to the first tile-based rendering query; and for the second tile-based rendering query:
 read the running counter that is also read for the first tile-based rendering query at the start of the second tile-based rendering query to determine a second start value;
 read the running counter at the end of the second tile-based rendering query to determine a second end value;
 subtract the second start value from the second end value to determine a second result indicating a number of discrete graphical entities of the subset of primitives associated with the second tile-based rendering query; and
 add the second result to an accumulator value stored in the second accumulate final result memory location allocated within the GPU memory to the second tile-based rendering query;

wherein, during processing of a particular tile, the determining of the second start value and second end value is nested within the determining of the first start value and first end value.

19. The computer-readable storage medium of claim 18, wherein the discrete graphical entities of the plurality of primitives associated with the first tile-based rendering query comprise pixels of the plurality of primitives, and wherein the discrete graphical entities of the subset of primitives associated with the second tile-based rendering query comprise pixels of the subset of primitives.

20. The computer-readable storage medium of claim 18, wherein the discrete graphical entities of the plurality of primitives associated with the first tile-based rendering query comprise the plurality of primitives, and wherein the discrete graphical entities of the subset of primitives associated with the second tile-based rendering query comprise the subset of primitives.

21. The computer-readable storage medium of claim 18, wherein the instructions, when executed, cause the one or more processors of the device to store the first start value in a first memory location separated from the first accumulate final result memory location, and store the first end value in a second memory location separate from the first accumulate final result memory location.

22. The computer-readable storage medium of claim 18, wherein the instructions, when executed, cause the one or more processors of the device to store the first start value in a first memory location allocated to the first tile-based rendering query, store the first end value in a second memory location allocated to the first tile-based rendering query, and overwrite the result to one of the first memory location or the second memory location.

23. The computer-readable storage medium of claim 18, wherein the first tile-based rendering query comprises an occlusion query.

* * * * *